United States Patent [19]

Greenberger

[11] Patent Number: 5,214,429

[45] Date of Patent: May 25, 1993

[54] COMPUTER METHOD UTILIZING KEYBOARD ADAPTER

[75] Inventor: David P. Greenberger, Edgewater, N.J.

[73] Assignee: R.E.T.S. Sales and Service, Inc., Edgewater, N.J.

[21] Appl. No.: 884,994

[22] Filed: May 18, 1992

Related U.S. Application Data

[63] Continuation of Ser. No. 587,220, Sep. 20, 1990, abandoned.

[51] Int. Cl.5 .................. H03M 11/00; B41J 29/02; A47B 21/00; G09B 13/00
[52] U.S. Cl. .................................. 341/22; 400/693; 434/229
[58] Field of Search ............... 400/472, 713, 714, 496, 400/691, 693, 467, 468, 676, 677, 690.2, 690.3; 235/145 R; 312/208; 341/22, 23; 340/712, 709; 434/227, 229, 118; 364/709.1, 709.12; 248/918

[56] References Cited

U.S. PATENT DOCUMENTS

| | | | |
|---|---|---|---|
| 4,092,527 | 5/1978 | Lueke | 341/22 |
| 4,119,839 | 10/1978 | Beckmann et al. | 364/709.1 |
| 4,704,940 | 11/1987 | Cummings | 341/23 |
| 4,745,397 | 5/1988 | Lagerbauer | 341/23 |
| 4,758,712 | 7/1988 | Matone, Jr. et al. | 312/208 |
| 4,949,080 | 8/1990 | Mikan | 340/709 |

Primary Examiner—Donald J. Yusko
Assistant Examiner—R. Gray
Attorney, Agent, or Firm—R. Neil Sudol; Henry D. Coleman

[57] ABSTRACT

An adapter device for use with a data-input-type keyboard comprises a housing defining a chamber receiving the keyboard. An upper housing panel is provided with a first opening at least coextensive with all keys on said keyboard. A plate is hingedly secured to the upper panel so that the plate covers the first opening in an access restriction or limited use position of the plate. The plate is provided with an opening at least coextensive with a predetermined set of keys, fewer than all of the keys of the keyboard. The device further comprises an alignment component for locating the housing relative to the keyboard so that the keyboard occupies a predetermined position relative to the housing and so that the second predetermined set of keys is aligned with the opening.

6 Claims, 3 Drawing Sheets

COMPUTER METHOD UTILIZING KEYBOARD ADAPTER

This application is a continuation of application Ser. No. 587,220, filed Sep. 20, 1990 now abandoned.

BACKGROUND OF THE INVENTION

This invention relates to data-entry-type keyboards such as those in common use with personal computers. More particularly, this invention relates to a device for adapting such a general purpose keyboard to specialized use situations.

Frequently, personal computers are loaded with user friendly programs which require use of only a small number of keys on standard keyboards such as the XT and AT PC keyboards popularized by IBM. For those unfamiliar with such data entry keyboards or the particular program which is being used, the large number of keys available on the data entry keyboard results in confusion and thus frustrates widespread use of the computer program.

OBJECTS OF THE INVENTION

An object of the present invention is to provide a device for adapting a data-entry-type keyboard to limited or specialized uses.

Another object of the present invention is to provide a device for facilitating different uses of a data-entry-type keyboard.

Another, more particular, object of the present invention is to provide a keyboard adapter device which renders the keyboard more user friendly in specialized applications.

A further particular object of the present invention is to provide a keyboard adapter device wherein switching between full keyboard use and partial keyboard use is facilitated.

Yet another particular object of the present invention is to provide such an adapter device which is inexpensive and easy to manufacture.

An additional particular object of the present invention is to provide such an adapter device which has an easy installation.

SUMMARY OF THE INVENTION

An adapter device for use with a data-input-type keyboard comprises, in accordance with the present invention, a housing defining a chamber receiving the keyboard, and access control means on the housing for restricting access to a first predetermined set of keys on the keyboard, while permitting access to a second predetermined set of keys on the keyboard.

Pursuant to a specific feature of the present invention, the housing includes an upper panel to restrict access to the first predetermined set of keys on the keyboard, the upper panel being provided with at least one opening to enable access to the second predetermined set of keys.

More specifically, the access control means includes the upper housing panel which is provided with a first opening at least coextensive with all keys on the keyboard. The access control means further includes a plate member movably attached to the upper panel, the plate member being provided with a second opening at least coextensive with the second predetermined set of keys. The plate member is preferably secured to the upper panel of the housing by means of a hinge.

The device further comprises an alignment component for locating the housing relative to the keyboard so that the keyboard occupies a predetermined position relative to the housing and so that the second predetermined set of keys is aligned with the opening in the plate member.

Pursuant to yet another feature of the present invention, the alignment component takes the form of a contact member attached to the housing for engaging the keyboard and guiding the housing and the keyboard relative to one another during a deposition of the housing around the keyboard. Specifically, the alignment component takes the form of a projection such as a plate attached to the housing, for example, to an underside of the upper panel.

Pursuant to a further feature of the present invention, the housing is provided on a bottom side with an opening at least coextensive with the keyboard, whereby the housing may be placed over the keyboard on a horizontal support surface.

In accordance with a further feature of the present invention, an indicator is provided on the upper panel of the housing for indicating specialized uses of the second predetermined set of keys.

In a specific embodiment of the invention, the indicator takes the form of a triangular pointer oriented with respect to one of the second predetermined set of keys. The pointer is juxtaposed with a corresponding alphanumeric designation.

A keyboard adapter in accordance with the present invention facilitates the conversion of a data-entry-type keyboard such as an XT or AT keyboard to a specialized use wherein only a limited number of preselected keys are assigned predetermined functions. The hinged plate serves to further facilitate a manual or mechanical switching between a full use keyboard configuration and a restricted use configuration.

The indicator designations on the face or upper panel of the housing provide a further "user friendly" aspect. Moreover, indicators disposed across an upper or distal portion of the housing can be aligned with menu designations at the bottom of a CRT monitor juxtaposed to the keyboard.

DETAILED DESCRIPTION

Figure 1:
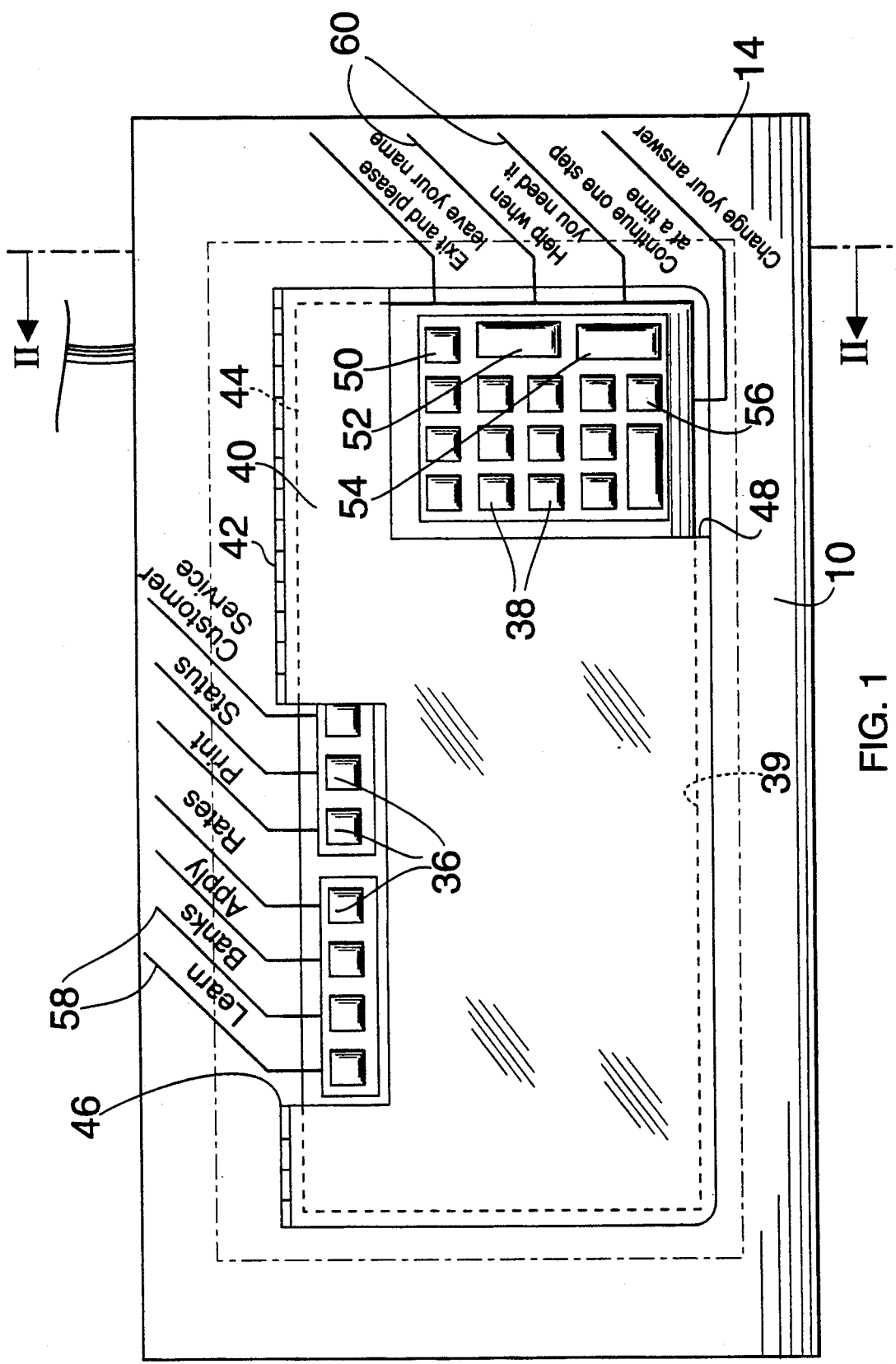
FIG. 1 is a top view of a keyboard adapter device in accordance with the present invention, showing a layout of indicator elements for designating specialized functions of the second predetermined set of keys.

As illustrated in the drawing, a keyboard adapter 10 comprises a housing 12 including a substantially planar upper panel 14, an elongate planar rear panel 16 (FIG. 2), planar side panels 18 (only one shown in the drawing) and an arcuate front panel 20. Front panel 20 is continuous with upper panel 14, while rear panel 16 and side panels 18 are joined to upper panel 14 along respective edges.

On an underside, upper panel 14 is provided with four partition members or planar projections 22, 24, 26 (only three shown in the drawing) connected to each other in a rectangular array to define a prismatic chamber 30 and a rectangular opening at the base of the chamber enabling housing 12 to be positioned over a keyboard 32 on a desk or table top so that the keyboard is received into the chamber.

Keyboard 32 may take any form, housing 12 being adapted in accordance with the invention to restrict access to some of the keys 34 on the keyboard, while permitting access to a predetermined set of other keys. The keyboard illustrated in the drawing is an IBM PC AT type keyboard which has a linear array of function keys 36 along a distal side, i.e., a side of the keyboard spaced from the user during use. Keyboard 32 also has a rectangular array of directional keys 38 along a right side.

Upper panel 14 of housing 12 is provided with a rectangular window or opening 39 smaller than keyboard 32 and at least coextensive with all of the keys of keyboard 32. In addition, housing 12 is provided with a planar plate member 40 swingably connected to upper panel 14 by a hinge 42. Hinge 42 extends along one edge 44 of window 39, so that, in a closed configuration or position of plate member 40, as depicted in FIGS. 1 and 2, the plate member overlaps window 39 and restricts access to most of the keys 3 of keyboard 32.

Plate member 40 is provided with a first cutout or opening 46 for providing access to a subset of the function keys 36. Plate member 40 is provided with a second cutout or opening 48 for providing access to another subset of keyboard keys 34, namely, directional keys 38. Cutout or opening 48 also provides access to a "minus" key 50, a "plus" key 52, an "enter" key 54, and a "delete" key 56.

During a positioning operation in which housing 12 is placed over keyboard 32 on a desk or table top, partition members 22, 24, 26 engage keyboard 32 and serve to align the keyboard with respect to housing 12 and more specifically to align the preselected subset of function keys 36 with cutout or opening 46 and directional keys 38 with cutout or opening 48.

Figure 2:
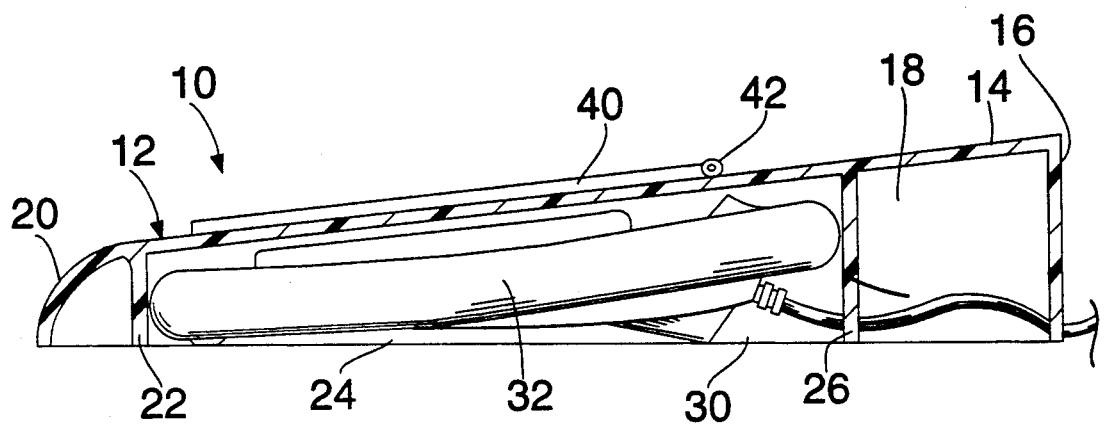
FIG. 2 is a cross-sectional view taken along line II—II in FIG. 1.

As shown in FIG. 1, housing 12 is provided along upper panel 14 with a plurality of slanted line segments 58 and 60 extending to respective keys in cutout 46 or 48. The slanted line segments 58 and 60 are associated with alphanumeric designations juxtaposed thereto, e.g., "Learn," "Banks," or "Change Your Answer," for purposes of identifying or otherwise indicating the functions of the respective keys.

Line segments 58 may be correlated with positions of menu choices at the bottom of a CRT monitor (not illustrated) to further facilitate recognition of the functions of the accessible keys in cooperation with a specific computer program.

A keyboard adapter 10 in accordance with the present invention is placed over keyboard 32 so that a user has access to only a preselected set of keys. Most, if not all, of those accessible keys will have a designated function in operating a specialized computer program, the functions for at least some of those keys being identified by line segments 58 and 60 and the associated alphanumeric indicators.

Figure 3:
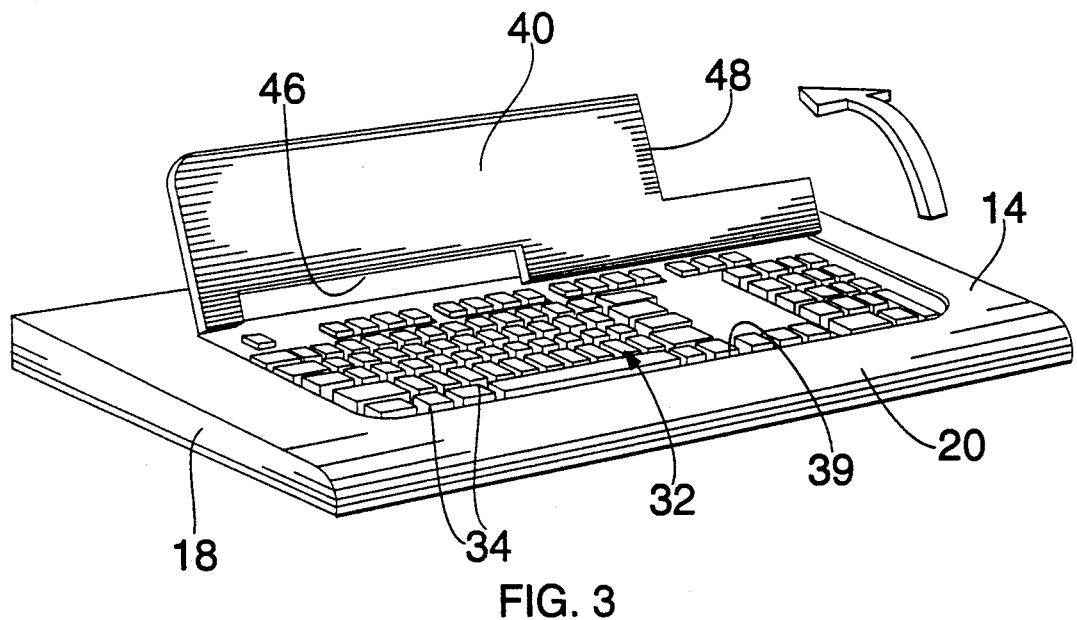
FIG. 3 is a perspective view of the adapter device of FIGS. 1 and 2, showing a configuration of the adapter allowing use of an entire keyboard.

A keyboard adapter 10 in accordance with the present invention facilitates comprehension and use of a specialized program, particularly by occasional or one-time users. In addition, should a desired function of the specialized program require the use of keys which are hidden or covered by plate member 40, that member may be temporarily swung aside into a full-use position shown in FIG. 3. The removal or shifting of plate member 40 is easy and quick and can be done many times daily without causing undue fatigue or inconvenience. For longer periods of normal use, for example, when another, more non-specialized program is being used, housing 12 may be removed in its entirety.

Figure 4:
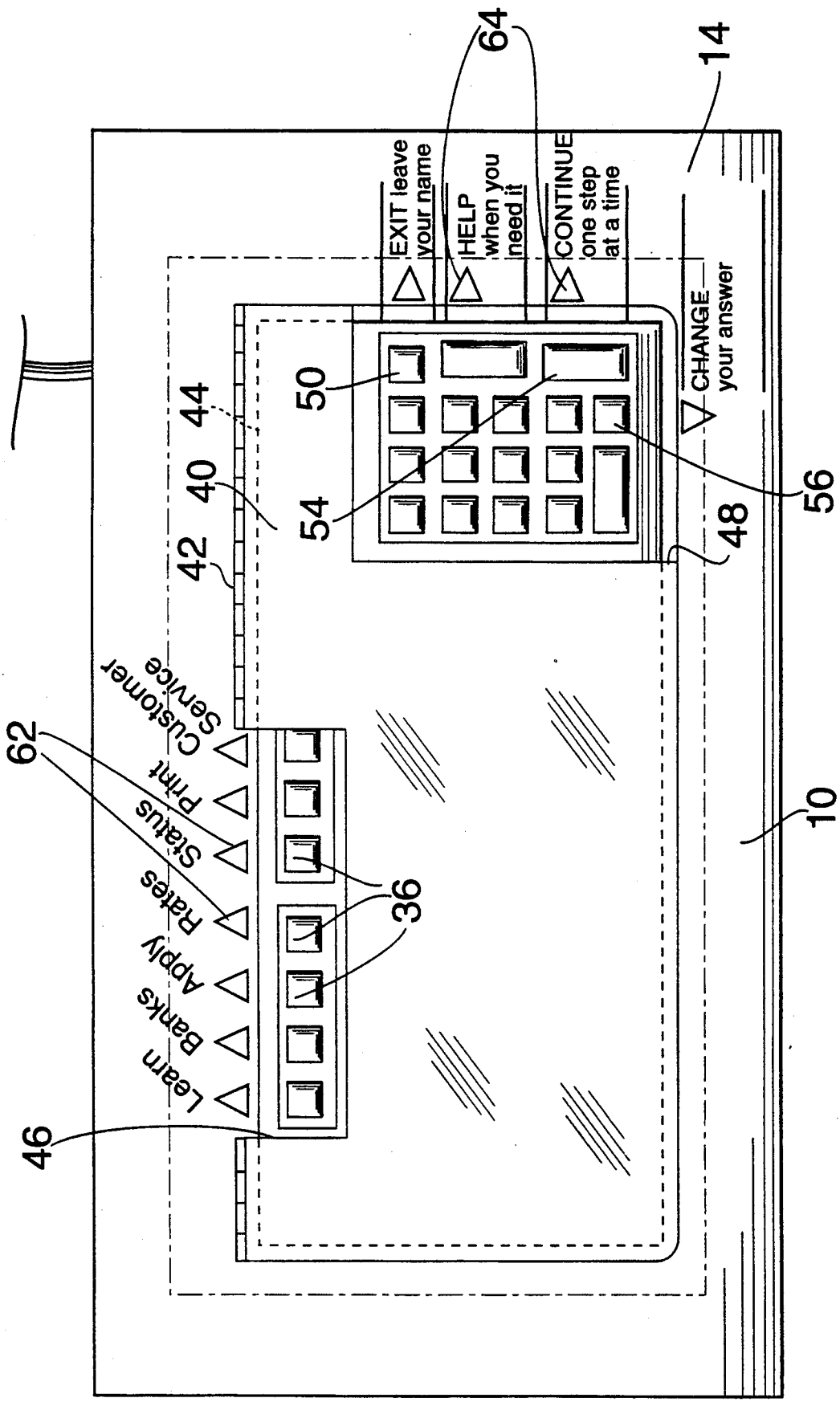
FIG. 4 is a top view similar to FIG. 1, but on another scale, showing another layout or scheme of key function indicators.

In FIG. 4, the same reference desginations are used for the hardware elements. As shown in that drawing figure, housing 12 is provided along upper panel 14 with a plurality of triangular pointers 62 and 64 juxtaposed to respective keys in cutout 46 or 48. The triangular pointers 62 and 64 are associated with alphanumeric designations juxtaposed thereto, e.g., "LEARN," "BANKS," or "HELP when you need it," for purposes of identifying or otherwise indicating the functions of the respective keys. The pointers may be applied to the upper panel 14 in virtualy any manner, for example, by decals, paint, or engraving.

As discussed hereinabove, pointers 62 may be correlated with positions of menu choices at the bottom of a CRT monitor (not illustrated) to further facilitate recognition of the functions of the accessible keys in cooperation with a specific computer program.

Although the invention has been described in terms of particular embodiments and applications, one of ordinary skill in the art, in light of this teaching, can generate additional embodiments and modifications without departing from the spirit of or exceeding the scope of the claimed invention. For example, plate member 40 may be removably attached to upper panel 14 by connectors other than a hinge, such as slide rails or hooks. Moreover, cutouts 46 and 48 could assume irregular, rather than rectangular, shapes and/or could be centrally, rather than peripherally, located with respect to plate member 40. Accordingly, it is to be understood that the drawings and descriptions herein are proferred by way of example to facilitate comprehension of the invention and should not be construed to limit the scope thereof.

What is claimed is:

1. A method for use with a computer having a data-input-type keyboard, comprising the steps of:

positioning said keyboard on a desk or table top;

providing an adapter device for said keyboard, said device including a housing defining a chamber for receiving the keyboard, said housing including an upper panel to restrict access to a first predetermined set of keys on said keyboard, said upper panel being provided with at least one first opening to enable access to a second predetermined set of keys on said keyboard, said housing being provided on a lower side with a second opening at least coextensive with said keyboard, said first opening and said second opening communicating with said chamber;

locating said housing above said keyboard so that said keyboard is aligned with said second opening and so that said second predetermined set of keys is aligned with said first opening;

lowering said housing over said keyboard on said desk or table top so that said keyboard is received in said chamber and resting said housing on said desk or table top so that said housing may be simply lifted from said desk or table top to enable access to said keyboard in its entirety; and actuating keys of said second predetermined set of keys while said housing is simply resting on said desk or table top over said keyboard.

2. The method defined in claim 1 wherein said upper panel includes a body portion and a planar plate member movably attached to said body portion, said first opening being provided in said plate member and said body portion being formed with an additional opening overlapped by said plate member in an access restriction configuration of said plate member relative to said body portion, further comprising the step of shifting said plate member relative to said body portion to enable access to at least some of said first predetermined set of keys via said additional opening.

3. The method defined in claim 2 wherein said plate member is secured to said body portion by means of a hinge, said step of shifting including the step of pivoting said plate member relative to said body portion.

4. The method defined in claim 1 wherein said second predetermined set of keys includes an array of directional keys.

5. The method defined in claim 1 wherein said upper panel is provided with another opening to permit access to a third predetermined set of keys on said keyboard.

6. A method for use with a data-input-type keyboard, comprising the steps of:
positioning said keyboard on a desk or table top;
providing an adapter device for said keyboard, said device including a housing defining a chamber receiving the keyboard and access control means on said housing for restricting access to a first predetermined set of keys on said keyboard, while permitting access to a second predetermined set of keys on said keyboard, said housing being provided on a lower side with an opening at least coextensive with said keyboard;
locating said hosing above said keyboard so that said keyboard is aligned with said opening;
lowering said housing over said keyboard on said desk or table top so that said keyboard is received in said chamber and resisting said housing on said desk or table top so that said housing may be simply lifted from said desk or table top to enable access to said keyboard in its entirety;
actuating keys of said second predetermined set of keys while said housing is simply resting on said desk or table top over said keyboard, said access control means including an upper panel of said housing provided with a first opening at least coextensive with all keys on said keyboard, said access control means further including a plate member movably attached to said upper panel, said plate member being provided with a second opening at least coextensive with said second predetermined set of keys; and
shifting said plate member relative to said body portion to enable access to at least some of said first predetermined set of keys via said additional opening.

* * * * *